US009402168B2

(12) United States Patent
Felbermeir et al.

(10) Patent No.: US 9,402,168 B2
(45) Date of Patent: Jul. 26, 2016

(54) OUTPUT OF MESSAGES RECEIVED BY A FIRST RECEIVING APPLIANCE AND BY A SECOND RECEIVING APPLIANCE

(75) Inventors: Christian Felbermeir, Langenmosen (DE); Sebastian Haas, Langquaid (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 13/996,659

(22) PCT Filed: Nov. 14, 2011

(86) PCT No.: PCT/EP2011/005714
§ 371 (c)(1),
(2), (4) Date: Jun. 21, 2013

(87) PCT Pub. No.: WO2012/084096
PCT Pub. Date: Jun. 28, 2012

(65) Prior Publication Data
US 2013/0281072 A1  Oct. 24, 2013

(30) Foreign Application Priority Data

Dec. 22, 2010  (DE) .......................... 10 2010 055 858

(51) Int. Cl.
*H04W 4/12* (2009.01)
*H04L 12/58* (2006.01)
(52) U.S. Cl.
CPC ................. *H04W 4/12* (2013.01); *H04L 51/22* (2013.01); *H04L 51/38* (2013.01)
(58) Field of Classification Search
CPC ... H04L 51/36; H04L 12/589; H04L 12/5835; H04L 12/5895; H04L 51/38; H04W 4/046; H04W 4/12; H04M 2203/4509; H04M 1/72547; H04M 3/53
See application file for complete search history.

(56) References Cited

U.S. PATENT DOCUMENTS

| 6,661,877 | B1 * | 12/2003 | Lee et al. ..................... 379/67.1 |
| 6,778,642 | B1 * | 8/2004 | Schmidt et al. ............ 379/88.13 |
| 7,603,379 | B2 * | 10/2009 | Kang et al. |
| 8,739,071 | B2 * | 5/2014 | Klassen et al. ................ 715/835 |
| 8,930,204 | B1 * | 1/2015 | Igoe .......................... G06F 9/00 705/2 |
| 2003/0023688 | A1 | 1/2003 | Denenberg et al. |
| 2005/0130631 | A1 * | 6/2005 | Maguire et al. ............ 455/414.1 |
| 2008/0140408 | A1 | 6/2008 | Basir |
| 2008/0266205 | A1 | 10/2008 | Moehring |
| 2009/0186597 | A1 * | 7/2009 | Lin ................. H04M 1/274583 455/405 |
| 2009/0203402 | A1 * | 8/2009 | Aftab ..................... G06Q 10/10 455/557 |

(Continued)

FOREIGN PATENT DOCUMENTS

| CN | 1747486 | 3/2006 |
| DE | 19640735 | 4/1998 |

(Continued)

OTHER PUBLICATIONS

PCT International Preliminary Report on Patentability mailed Jun. 27, 2013 in corresponding International Application No. PCT/EP2011/005714.

(Continued)

*Primary Examiner* — Liton Miah
(74) *Attorney, Agent, or Firm* — Staas & Halsey LLP

(57) ABSTRACT

In a motor vehicle, messages received by a first receiving appliance and messages received by a second receiving appliance are joined to form a common message base and are output in combined form.

20 Claims, 2 Drawing Sheets

(56) References Cited

U.S. PATENT DOCUMENTS

| | | | |
|---|---|---|---|
| 2010/0029305 A1* | 2/2010 | Gupta | .................. 455/466 |
| 2010/0210315 A1 | 8/2010 | Miyake | |
| 2010/0248694 A1 | 9/2010 | Suzuki | |
| 2011/0029622 A1* | 2/2011 | Walker | ........... G06Q 10/107 709/206 |
| 2012/0064924 A1* | 3/2012 | Schapsis | ........ H04L 12/5805 455/466 |
| 2012/0117499 A1* | 5/2012 | Mori | .......... H04M 1/72569 715/765 |

FOREIGN PATENT DOCUMENTS

| | | |
|---|---|---|
| DE | 10200002 | 8/2002 |
| DE | 10116246 | 3/2003 |
| DE | 102005001759 | 7/2006 |
| DE | 102010055858.3 | 12/2010 |
| EP | 2001144 | 12/2008 |
| EP | 2051492 | 4/2009 |
| WO | 01/48985 | 7/2001 |
| WO | PCT/EP2011/005714 | 11/2011 |

OTHER PUBLICATIONS

European Office Action for related Europeen Patent Application No. 11785339.0, issued Oct. 31, 2013.
Wikipedia Article "GPS-Technik," Version Nov. 27, 2010, 13 pages.
English language translation of International Search Report for PCT/EP2011/005714, mailed Jan. 3, 2012, 3 pages.
Chinese Office Action dated Mar. 24, 2015 from Chinese Patent Application No. 201180061773.5, 11 pages.
Chinese Office Action dated Oct. 10, 2015 from Chinese Patent Application 201180061773.5, 5 pages.
Chinese Office Action dated Feb. 15, 2016 from Chinese Patent Application No. 201180061773.5, 7 pages.

* cited by examiner

`US 9,402,168 B2`

OUTPUT OF MESSAGES RECEIVED BY A FIRST RECEIVING APPLIANCE AND BY A SECOND RECEIVING APPLIANCE

CROSS REFERENCE TO RELATED APPLICATIONS

This application is based on and hereby claims priority to International Application No. PCT/EP2011/005714 filed on Nov. 14, 2011 and German Application No. 10 2010 055 858.3 filed on Dec. 22, 2010, the contents of which are hereby incorporated by reference.

BACKGROUND

The invention relates to the output of messages received by a first receiving appliance and/or by a second receiving appliance in a motor vehicle.

Short messages (SMS) are currently transmitted, displayed and/or sent by a mobile terminal (cell phone) in motor vehicles using an integrated communication module (GSM/UMTS module) or using AT commands via Bluetooth.

When using the integrated communication module, messages which have already been received cannot be displayed. The use of AT commands is very limited owing to the poor dissemination and support by the mobile appliances. Reception and/or transmission of emails is/are entirely impossible.

DE 102 00 002 A1 discloses an electronic interactive network method via a traffic telecommunications center.

DE 101 16 246 A1 describes a cost-effective implementation of instant messaging functions for group subscribers whose terminals are supplied with personalized information via an interactive network server INS and a GSM or UMTS telecommunications system. In this case, after conversion to an object-oriented, platform-independent description language, group messages are output in the form of multicast information via a separate interface which is connected to a DAB/DVB playout center. The multicast information is transmitted to the mobile terminals or group subscribers via separate DVB-T or DAB data channels. The terminals associated with the group subscribers are additionally provided with a module for receiving DAB/DVB information and likewise have a corresponding component of the abovementioned object-oriented, platform-independent description language. The network functionality is transparent to the subscribers. The subscribers do not worry about the physical path on which the services reach the relevant terminals. An adequate variety of services, which is comparable to stationary services in buildings, is also intended to be offered to the subscribers in moving objects, for example in vehicles.

DE 10 2005 001 759 A1 discloses a modular, mobile communication, data acquisition and data processing unit which minimizes the previously used multiplicity of terminals, such as a notebook, PDA, mobile telephone and external navigation systems, in particular in the field, and simplifies data transfer and transmission. The unit includes a combination of different individual appliances, a mobile appliance, for example a personal digital assistant (PDA), with a mobile telephone unit and a navigation unit and is provided with a wide variety of communication interfaces such as UMTS, GPRS, GSM, WLAN, Bluetooth, USB etc.

SUMMARY

On the basis of this, one possible object is making the reception and display of messages easier and clearer for the driver of a motor vehicle, in which case the variety of functions is intended to be expanded at the same time.

Accordingly, the inventors propose a method for outputting messages received by a first receiving appliance and/or by a second receiving appliance on an output unit in a motor vehicle. The messages received by the first receiving appliance and the messages received by the second receiving appliance are automatically combined and are output together. The available communication channels, in particular GSM/UMTS module and mobile terminal, are combined in this manner and are preferably supplemented with the functionality of transmitting and receiving emails. More preferably, the restriction of AT commands is canceled by the use of new communication possibilities, for example Bluetooth and its application profiles.

Messages are preferably received in different message types, messages of the same message type received by the first receiving appliance and messages of the same message type received by the second receiving appliance being output contiguously. Message types are, for example, SMS, email, tweets (Twitter) and messages from messenger services.

More preferably, the receiving appliances also have transmitting apparatuses for transmitting messages. In this case in particular, for a message, the receiving appliance which received the message is stored and, when transmitting a response to the message, this response is transmitted automatically by the receiving appliance which received the message.

The messages are preferably output on a display. The display preferably has a plurality of regions, one message type respectively being output in one region.

Alternatively, the display can be changed over between a plurality of modes, a different message type of messages composed of messages received by the first receiving appliance and messages received by the second receiving appliance respectively being displayed in each mode.

The messages can preferably also be acoustically output. Short messages received using the first receiving appliance are thus output, for example, at times close to short messages received by the second receiving appliance.

A communication module integrated in the motor vehicle is preferably used as the first receiving appliance.

A mobile terminal which is or can be connected to the apparatus is preferably used as the second receiving appliance.

An apparatus having an output unit for outputting messages received by a first receiving appliance and messages received by a second receiving appliance has a combination unit for combining the messages received by the first receiving appliance and the messages received by the second receiving appliance to form a common message base for combined output of the messages received by the first receiving appliance and the messages received by the second receiving appliance.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1A:
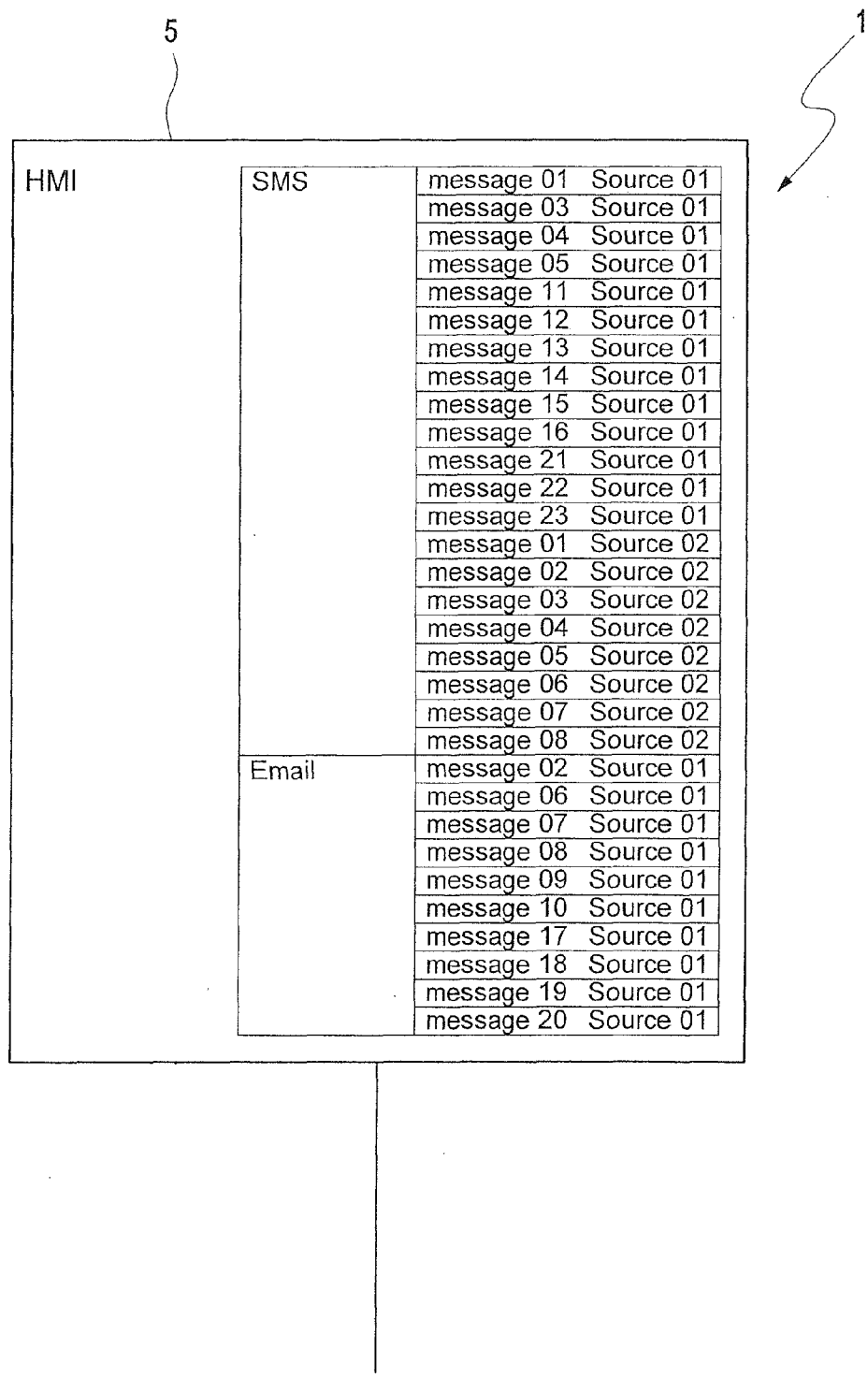
FIGS. 1A and 1B show an apparatus having a first receiving appliance for receiving messages and a second receiving appliance for receiving messages.

Reference will now be made in detail to the preferred embodiments of the present invention, examples of which are illustrated in the accompanying drawings, wherein like reference numerals refer to like elements throughout.

Figure 1B:
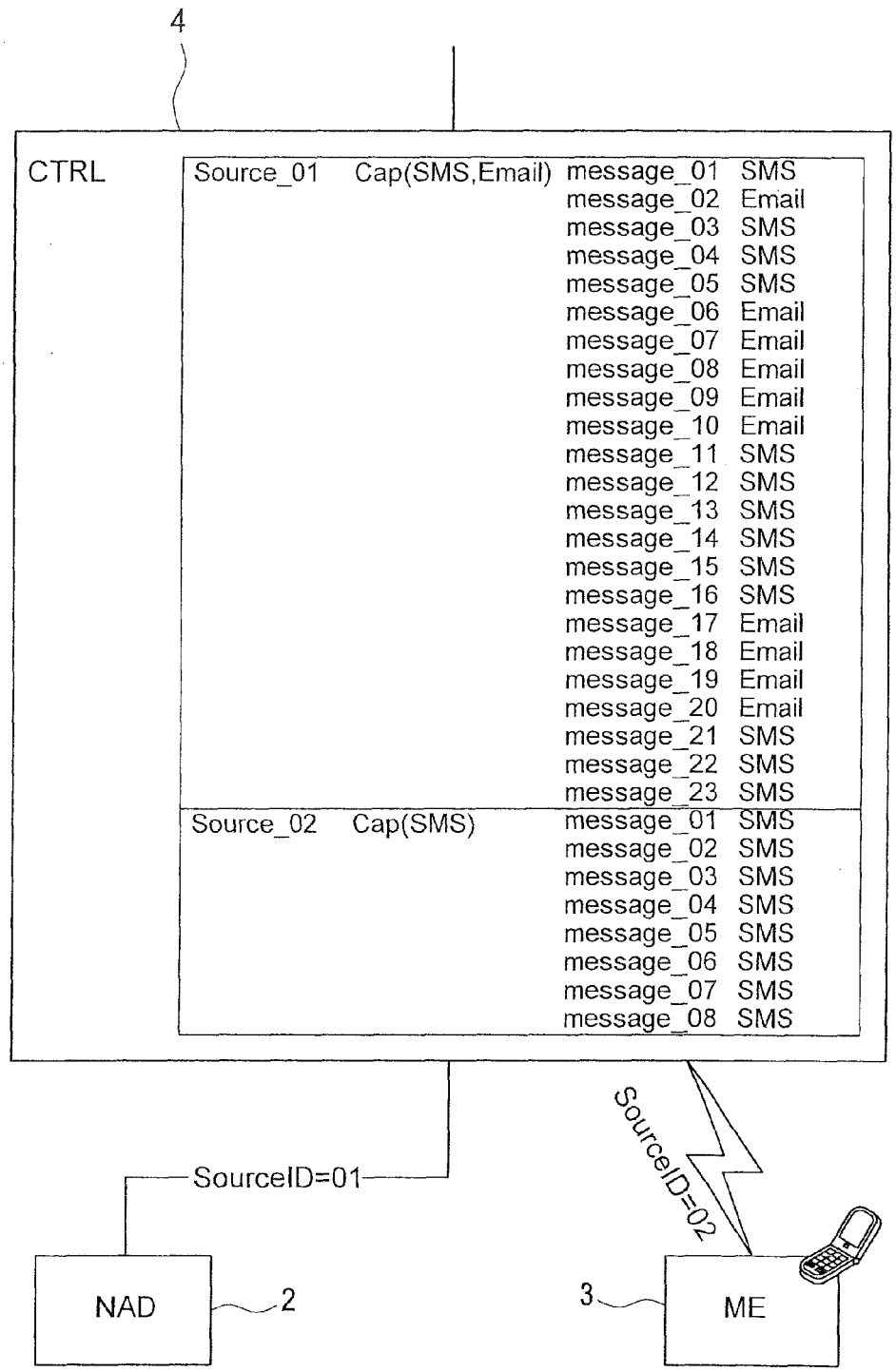

FIGS. 1A and 1B show an apparatus 1 in the form of a messaging system of a motor vehicle, having a first receiving appliance 2 in the form of a permanently installed communication module and a second receiving appliance 3 in the form of a wireless communication module. FIG. 1B is a continuation of FIG. 1A. The apparatus also has a combination unit 4 in the form of a controller for combining the messages received by the first receiving appliance 2 and the messages received by the second receiving appliance 3 to form a common message base for combined output on an output appliance 5 in the form of a human machine interface (HMI). For this purpose, signals and messages from the first receiving appliance 2 in the form of a communication module, in particular a network access device, are merged in the combination unit with the signals and messages received wirelessly (for example via Bluetooth) by one or more second receiving appliances in the form of mobile terminals and are combined to form a general message base.

In this case, the existing data are used to decide which message variants (for example SMS, email, instant messaging etc.) are supported by the first receiving appliance or the second receiving appliance. Capability bits are received and processed for this purpose, which bits are set via the network access device and a message access profile which makes it possible to read mobile terminals.

If a particular message type is not available, it is grayed out with its function in the output unit.

The individual receiving paths from the different receiving appliances 2, 3 are virtualized as sources (sourceID) inside the combination unit and the messages are therefore expanded as additional information. In the transmitting direction, the explicit transmission path can be selected by stating the dedicated source (sourceID) or the controller uses the message type to be transmitted to decide which transmission path is intended to be used.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. An apparatus in a motor vehicle, comprising:
a first receiving appliance, the first receiving appliance being a message transmitter/receiver communication module integrated in the motor vehicle to receive a message from an external source;
a second receiving appliance, the second receiving appliance being a message transmitter/receiver appliance to receive a message from an external source;
a controller integrated in the motor vehicle to combine messages received by the first receiving appliance from the external source and messages received by the second receiving appliance from the external source, to form a common message base for combined output of the messages received by the first and second receiving appliances; and
an output unit to output the messages received by the first and second receiving appliances according to the common message base, wherein
for each message combined by the controller, an identifier is stored to indicate which receiving appliance originally received the message, and
when a first response is received by the controller to a first message among the messages received by the first and second receiving appliances and output via the output unit, the controller is configured to route the first response to the first message from the controller to the respective receiving appliance which originally received the first message, by using the stored identifier, and the respective receiving appliance which originally received the first message is configured to transmit the first response to the external source which originally sent the message to the respective receiving appliance.

2. The apparatus as claimed in claim 1, wherein
the messages have different message types, and
the controller combines the messages to contiguously output same type messages received by the first receiving appliance and contiguously output same type messages received by the second receiving appliance.

3. The apparatus as claimed in claim 1, wherein
the output unit is a display,
the messages have different message types,
the controller determines which type of message is received, and
the controller prepares the common message base such that different types of messages are displayed in different areas of the display.

4. The apparatus as claimed in claim 1, wherein
the output unit is a display, and
the messages are displayed on the display.

5. The apparatus as claimed in claim 4, wherein
the messages have different message types,
the display has a plurality of regions, and
each of the regions displays messages of one type.

6. The apparatus as claimed in claim 4, wherein
the messages have different message types,
the controller combines the messages to contiguously output same type messages received by the first receiving appliance and contiguously output same type messages received by the second receiving appliance,
the display has a plurality of regions, and
each of the regions displays messages of one type.

7. The apparatus as claimed in claim 4, wherein
the messages have different message types,
the display is switchable between a plurality of different display modes, and
the different message types are displayed respectively in the different display modes.

8. The apparatus as claimed in claim 4, wherein
the messages have different message types,
the controller combines the messages to contiguously output same type messages received by the first receiving appliance and contiguously output same type messages received by the second receiving appliance,
the display is switchable between a plurality of different display modes, and
the different message types are displayed respectively in the different display modes.

9. The apparatus as claimed in claim , wherein
the output unit is an audio device, and
the messages are acoustically output via the audio device.

10. The apparatus as claimed in claim 1, wherein the second receiving appliance is a mobile terminal.

11. The apparatus as claimed in claim 1, wherein:
the output unit is integrated in the motor vehicle to output the received by the first and second receiving appliances according to the common message base,
the output unit includes at least one display, and
the at least one display includes:
- a first region which displays only messages of a first message type received from the first receiving appliance and the second receiving appliance depending on whether the first receiving appliance and second receiving appliance support the first message type, and
- a second region which displays only messages of a second message type received from the first receiving appliance and the second receiving appliance depending on whether the first receiving appliance and second receiving appliance support the second message type.

12. The apparatus as claimed in claim 11, wherein the at least one display groups messages of the first message type in the first region contiguously, according to which receiving appliance received the messages of the first message type.

13. A method for outputting messages in a motor vehicle, comprising:
receiving messages by a first receiving appliance from an external source, the first receiving appliance being a message transmitter/receiver communication module integrated in the motor vehicle;
receiving messages by a second receiving appliance from an external source, the second receiving appliance being a message transmitter/receiver appliance;
combining, by a controller integrated in the motor vehicle, the messages received by the first receiving appliance from the external source with messages received by the second receiving appliance from the external source, the messages being combined to form a common message base;
outputting the messages received by the first and second receiving appliances according to the common message base via an output unit; and
for each message combined, storing an identifier to indicate which receiving appliance originally received the message, and
when transmitting a first response to a first message among the messages received by the first and second receiving appliances and output via the output unit, the method further comprises:
  receiving, via the controller, the first response to the first message;
  routing the first response to the first message from the controller to the respective receiving appliance which originally received the first message, by using the stored identifier; and
  transmitting the first response by the respective receiving appliance which originally received the first message to the external source which originally sent the first message to the respective receiving appliance.

14. The method as claimed in claim 13, wherein
the messages have different message types, and
the messages are combined to contiguously output same type messages received by the first receiving appliance and contiguously output same type messages received by the second receiving appliance.

15. The method as claimed in claim 13, wherein
the output unit is a display, and
the messages are displayed on the display.

16. The method as claimed in claim 15, wherein
the messages have different message types,
the display has a plurality of regions, and
each of the regions displays messages of one type.

17. The method as claimed in claim 15, wherein
the messages have different message types,
the display is switchable between a plurality of different display modes, and
the different message types are displayed respectively in the different display modes.

18. The method as claimed in claim 13, wherein
the output unit is an audio device, and
the messages are acoustically output via the audio device.

19. The method as claimed in claim 13, wherein the second receiving appliance is a mobile terminal.

20. An apparatus in a motor vehicle, comprising:
a first receiving appliance, the first receiving appliance being a message transmitter/receiver communication module integrated in the motor vehicle to receive a message from an external source;
a second receiving appliance, the second receiving appliance being a message transmitter/receiver appliance to receive a message from an external source;
a combination unit to combine messages received by the first receiving appliance from the external source and messages received by the second receiving appliance from the external source, to form a common message base for combined output of the messages received by the first and second receiving appliances; and
an output unit including a display to output the common message base, wherein
for each message combined by the combination unit, an identifier is stored to indicate which receiving appliance received the message,
when transmitting a response to the message, the response is automatically transmitted by the respective receiving appliance which received the message to the external source which sent the message to the respective receiving appliance, according to the stored identifier, and
the display is configured so that:
messages are displayed on the display by dividing the display into a number of regions corresponding to a number of message types,
messages displayed in a first region are messages only of a first type which are received by the first receiving appliance and the second receiving appliance,
messages displayed in a second region are messages only of a second type which are received by the first receiving appliance and the second receiving appliance,
the messages displayed in the first region are displayed such that messages of the first type which are received by the first receiving appliance are displayed consecutively, and messages of the first type which are received by the second receiving appliance are displayed consecutively after the messages of the first type which are received by the first receiving appliance, and
the messages displayed in the second region are displayed such that messages of the second type which are received by the first receiving appliance are displayed consecutively, and messages of the second type which are received by the second receiving appliance are displayed consecutively after the messages of the second type which are received by the first receiving appliance.

* * * * *